FREQUENCY AND TIME-PROPORTIONAL SIGNAL CONTROL DEVICES EMPLOYING SEPARATE CONVERTORS FOR CONVERTING A PRESCRIBED VALUE AND THE MEASURED VALUE

Filed April 20, 1966 4 Sheets-Sheet 1

INVENTORS
GERHARD KAPS
WINFRIED SCHOTT
BY
Frank R. Trifari
AGENT

INVENTORS
GERHARD KAPS
WINFRIED SCHOTT
BY
Frank R. Trifari
AGENT

INVENTORS
GERHARD KAPS
WINFRIED SCHOTT
BY
Frank R. Trifari
AGENT

FREQUENCY AND TIME-PROPORTIONAL SIGNAL CONTROL DEVICES EMPLOYING SEPARATE CONVERTORS FOR CONVERTING A PRESCRIBED VALUE AND THE MEASURED VALUE

Filed April 20, 1966 4 Sheets-Sheet 4

INVENTORS
GERHARD KAPS
WINFRIED SCHOTT
BY
[signature]
AGENT

United States Patent Office 3,529,246

Patented Sept. 15, 1970

3,529,246

FREQUENCY AND TIME-PROPORTIONAL SIGNAL CONTROL DEVICES EMPLOYING SEPARATE CONVERTERS FOR CONVERTING A PRESCRIBED VALUE AND THE MEASURED VALUE

Gerhard Kaps, Hamburg-Lokstedt, and Winfried Schott, Garstedt, Germany, assignors, by mesne assignments to U.S. Philips Corporation, New York, N.Y., a corporation of Delaware Filed Apr. 20, 1966, Ser. No. 544,015
Claims priority, application Germany, May 22, 1965, P 36,867
Int. Cl. H03b *3/02, 3/04*
U.S. Cl. 328—134 4 Claims

ABSTRACT OF THE DISCLOSURE

A device for producing a voltage in response to a frequency difference by converting a measured frequency to a voltage, a fixed frequency to a second voltage, and comparing both voltages.

Figure 1:
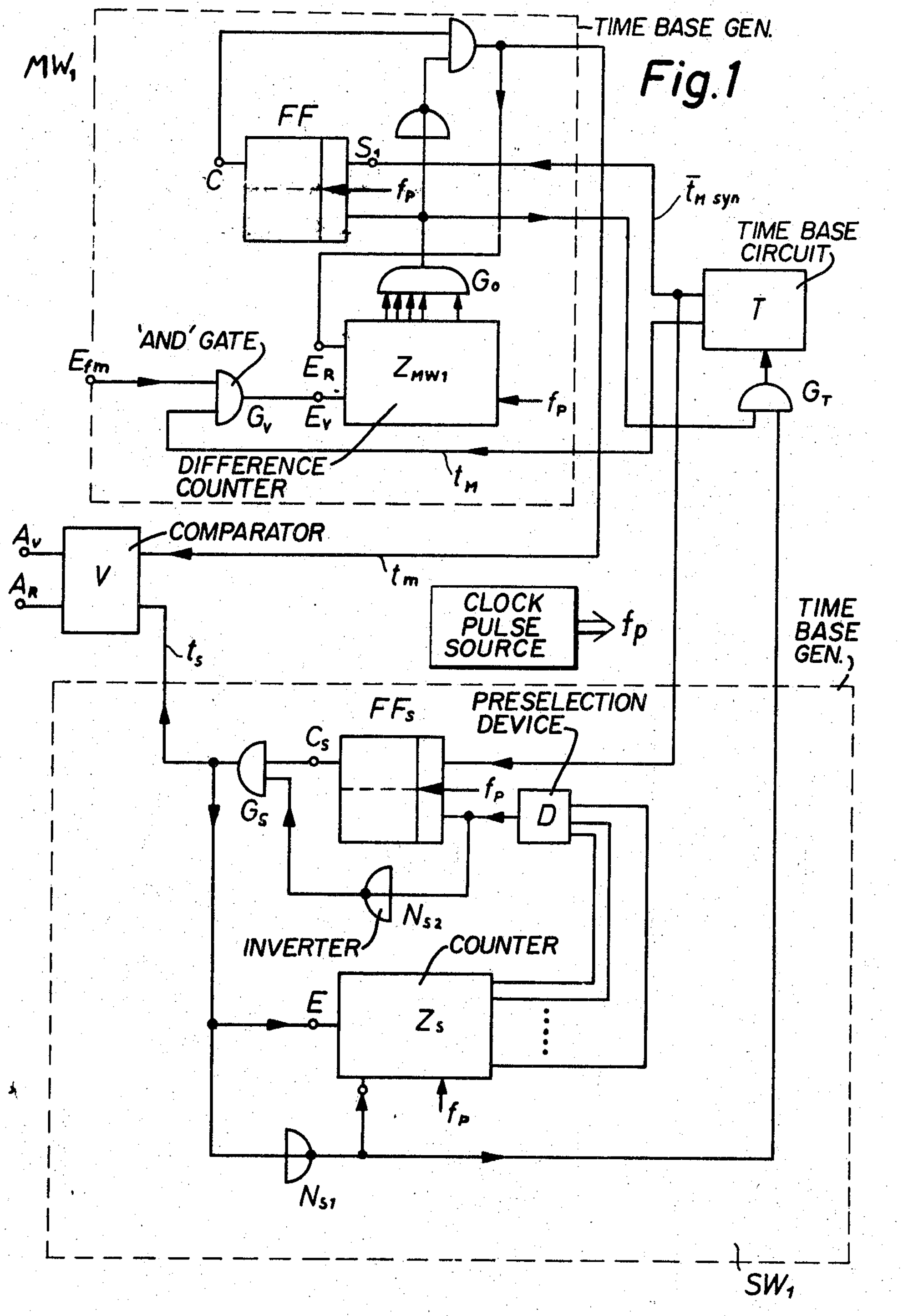

The invention relates to a frequency- and time-proportional signal control device in which use is made of separate convertors for converting a prescribed value and the measured value.

In such a control device, for example, the measured values are represented by frequencies while the prescribed values are expressed in numbers which are adjusted or written. The invention more particularly relates to ratio controls in which the numbers adjusted or written as prescribed values are proportional to the mutual ratios of the controlled quantities independently of their absolute values.

Control devices in which measured quantities analogous in frequency are compared with adjustable numerical prescribed quantities are known, that is to say for different embodiments thereof. According to a first embodiment, the frequency $f_o$ of the pulses supplied by a clock generator is divided by arbitrarily adjustable integral numbers $z_i$, and the prescribed values $f_o/z_i$ thus obtained are compared with the measured values. A disadvantage is that the fineness of the subdivision of the prescribed value is determined by the divisor $z_i$ so that in case of a fine subdivision a high frequency $f_o$ is required. Furthermore, it is necessary either to be able to adjust the reciprocal numerical value of the prescribed value or to provide the device with a code convertor.

In a second embodiment, the frequency $f_i$ to be processed as measured quantity is divided by a number which is proportional to the prescribed value. With a given subdivision of the prescribed value to be adjusted, the measuring frequency $f_i$ must be comparatively high, which often gives rise to difficulties with respect to the pick-up device.

Furthermore, the loop amplification of the control circuit is dependent upon the prescribed value and since the amplification influences the dynamic behaviour of the control circuit, the dynamic behaviour also depends upon the prescribed value.

In a third embodiment, a pulse sequence proportional to the prescribed value is built up by dividing a pulse sequence of the frequency $f_o$ produced by a clock generator by integral numbers and by adding in a suitable manner the pulse sequences of the frequencies $f_o/z_i$ thus obtained in accordance with the prescribed value. A pulse sequence built up in this manner generally exhibits errors with respect to periodicity, which by suitable "selection prescriptions" can be reduced to a minimum, it is true, but not to zero.

Finally, the prescribed frequency can be derived from a clock frequency by multiplying it by an integral number. However, this requires a separate and complicated control circuit.

The object of the invention is to provide a control device which does not exhibit the said disadvantages and in which the prescribed finely subdivided values can be directly written or adjusted numerically and without code conversion in the form of numbers, while the dynamic behavior is independent of the prescribed values. According to the invention, this is achieved in that provision is made of means for converting the measured frequencies to measured time intervals proportional to these frequencies and for converting adjusted and/or written prescribed values to prescribed time intervals proportional to these values and of means known per se for comparing each two associated measured and prescribed time intervals.

Figure 2:
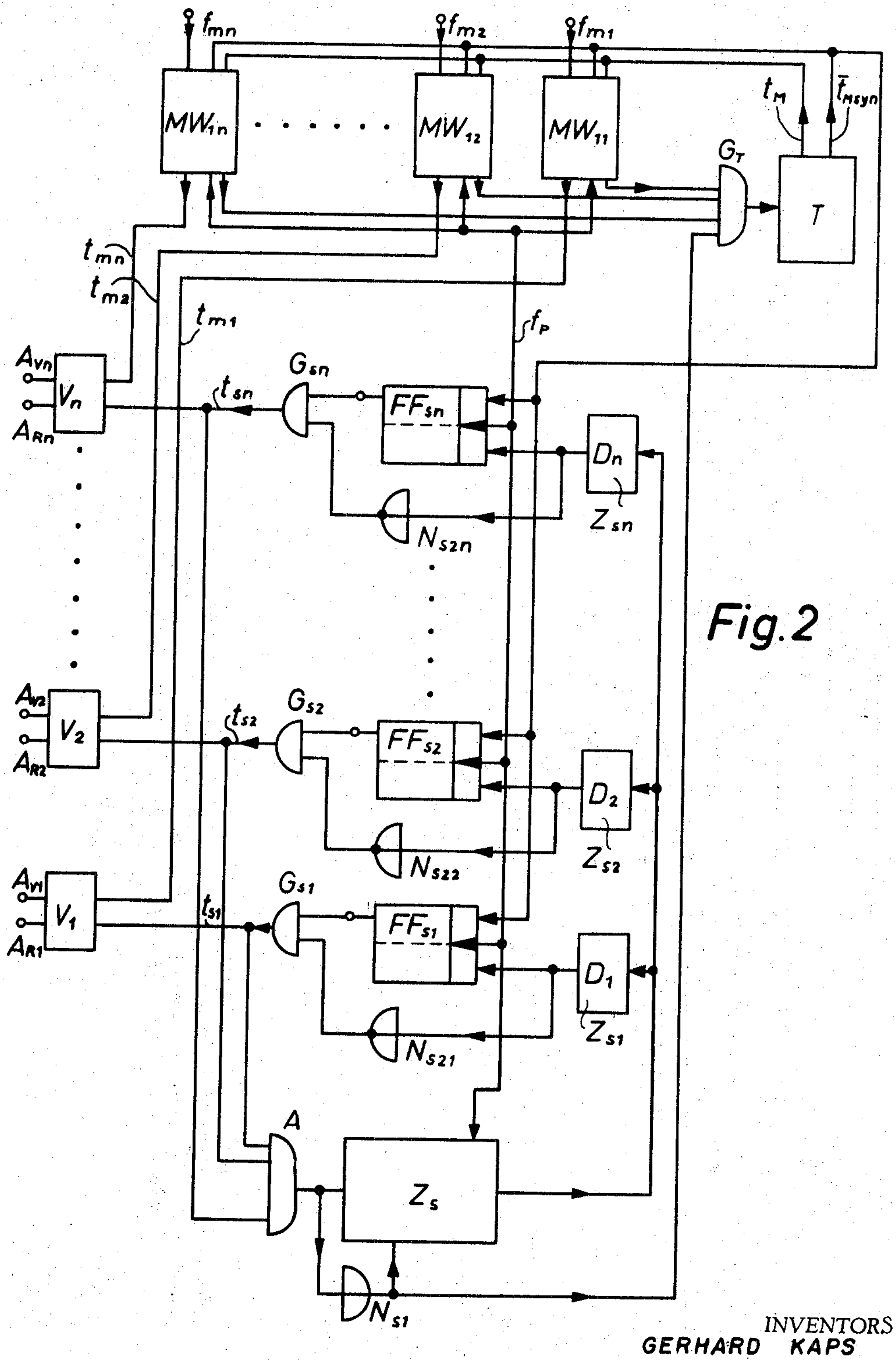
Figure 3:
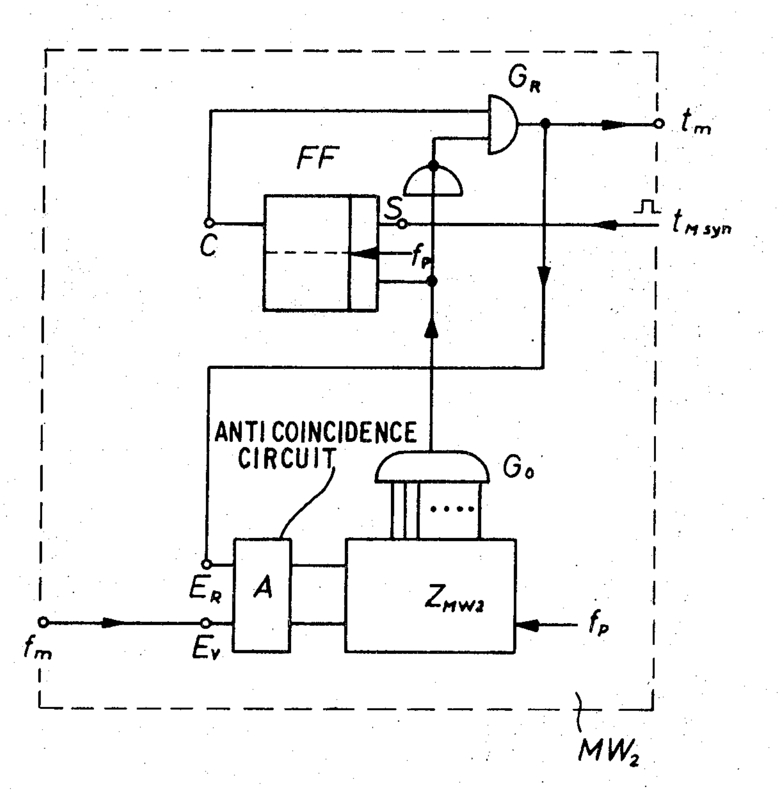
Figure 4:
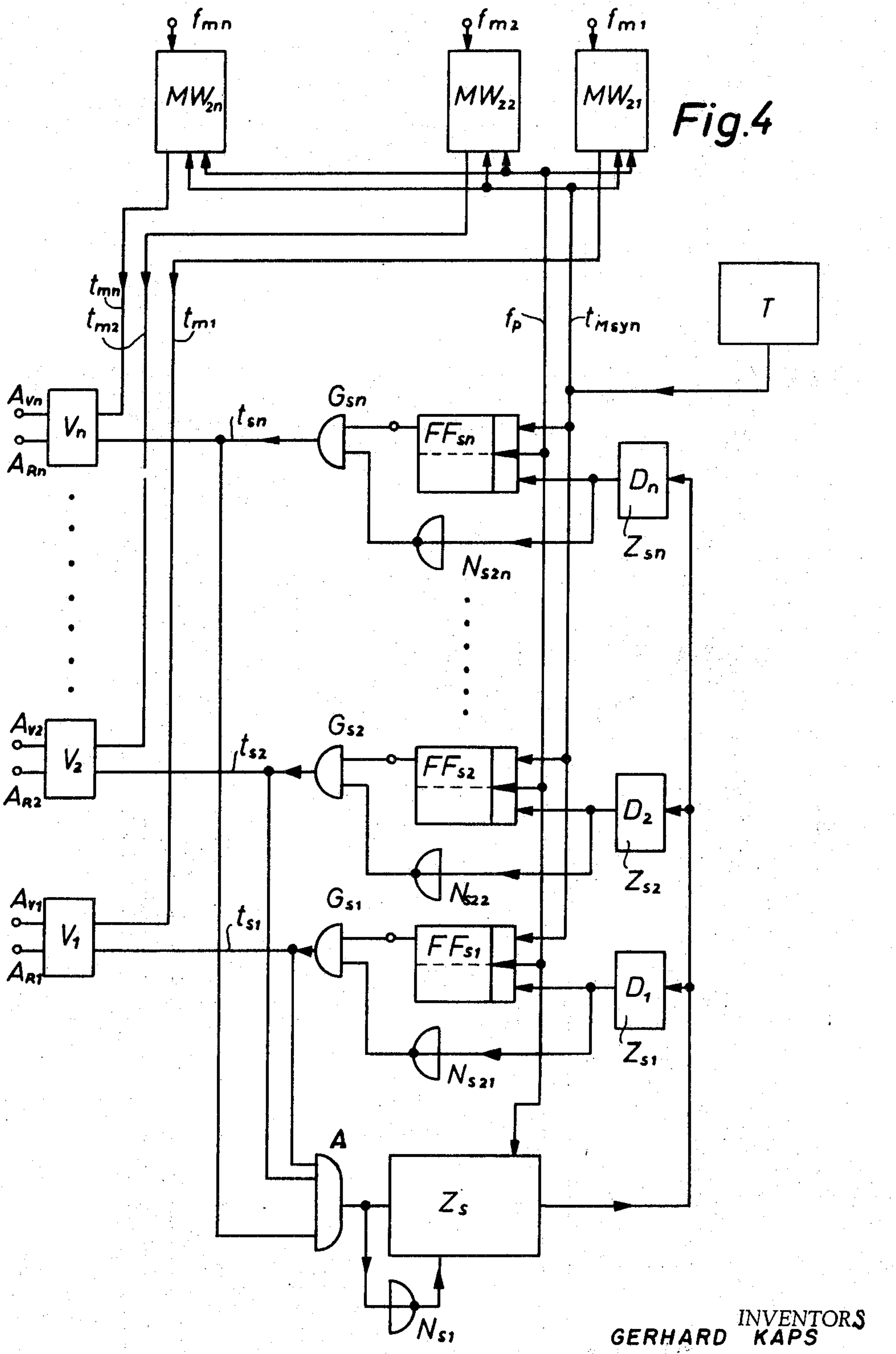

The invention will now be described more fully with reference to the accompanying drawing, in which:

FIG. 1 shows the circuit diagram of a convertor for measured values suitable for use in a device for providing a prescribed time interval in accordance with the invention, FIG. 2 shows the same device as FIG. 1, however, the number of control circuits being enlarged, FIG. 3 shows the circuit diagram of a convertor for measured values in accordance with the invention in which information is prevented from getting lost by continuous recording of the frequency to be measured, FIG. 4 shows a control device in accordance with the invention having several channels which consists of a convertor shown in FIG. 3 and a device for producing the prescribed value.

The embodiments of FIGS. 1 to 4 all use a synchronous technique, that is to say that the change-over of the flip-flop circuits and of the counting stages is effected after being prepared by one central clock pulse at the signal input. Each counting stage is switched further by one unity if the preparation signal is applied to the signal input during the whole time interval between successive clock pulses. If a continuous signal is applied to the signal input, counting is performed with the frequency of the clock pulses. In each figure, the clock pulse source is indicated symbolically as $f_p$, and is shown as a block in FIG. 1.

FIG. 1 shows the circuit diagram of a device in accordance with the invention for one control channel consisting of a convertor for measured values such as the time base generator $MW_1$, a device for producing a prescribed time interval such as the time base generator $SW_1$ and a known circuit arrangement V for comparing the prescribed time interval and the measured time interval and further a time base circuit T also known. An arbitrary frequency analog pick-up device (not shown), for example, a revolution counter, supplies the frequency $f_m$ to be measured to the input $E_{fm}$. This frequency is synchronized with the clock pulse frequency $f_p$ in a synchronization stage (not shown either). The frequency to be measured which must be converted to a proportional time interval is supplied through a gate $G_V$ to the positive input $E_V$ of a difference counter $Z_{MW1}$. It is assumed that the counter $Z_{MW1}$ is in the "zero" position and that the output C of the bistable flip-flop circuit FF has the logic potential characteristic of zero. Consequently, the negative input $E_R$ of the counter $Z_{MW1}$ is blocked through the "and" gate $G_R$. During the measuring period $t_M$, the counter $Z_{MW1}$ counts until the position $$z_M = \underline{f_m} \cdot t_M$$

has been attained. A pulse $\overline{t_{Msyn}}$ prepares through the signal input $S_1$ the change-over of the bistable flip-flop circuit FF which then coincides with the clock pulse.

After the change-over, the negative input $E_R$ of the counter $Z_{MW1}$ is at "L" potential through the "and" gate $G_R$ so that the counter counts negatively with the clock pulse frequency. When the counter reaches the zero position, this is ascertained by the "and" gate $G_0$ so that the negative counting is stopped and the change-over of the bistable flip-flop circuit FF back to its initial position is prepared. The "L" signal at the negative input has a duration $t_m = z_M/f_p = f_m \cdot t_M/f_p$ and is consequently proportional to the measured frequency $f_m$.

The prescribed time interval is produced in a device $SW_1$. This device consists of a positive counter $Z_S$, a preselection device D which can be adjusted numerically, a bistable control stage $FF_S$, an "and" gate $G_S$ and inverter stages $N_{S1}$ and $N_{S2}$. During a measuring interval $t_M$, the counter $Z_S$ remains in the zero position and the output $C_S$ of the bistable flip-flop circuit $FF_S$ has "0" potential.

It is assumed that the pre-selection device D is adjusted to the number $z_S > 0$ characteristic of the prescribed value so that its output has "0" potential and the "and" gate $G_S$ is prepared through the inverter stage $N_{S2}$. As was the case with the converter for the measured values, the bistable flip-flop circuit $FF_S$ is also changed over by the pulse $\bar{t}_{Msyn}$ prduced at the end of the measuring period $t_M$ and synchronized by the clock generated together with coincidence clock pulse so that the counting of the clock pulses in the counter $Z_S$ starts simultaneously with the negative counting of the counter $Z_{MW1}$. When the preselected number has been attained, the output of the preselection device D has "L" potential; the counting process is stopped through $N_{S2}$ and $G_S$, the bistable flip-flop circuit $FF_S$ is changed back to its initial position and the counter $Z_S$ is switched to the zero position via the inverter stage $N_{S1}$. The output of the "and" gate $G_S$ has "L" potential during the prescirbed time interval $t_s = z_S/f_p$, that is to say that the duration of the prescribed time interval is proportional to the pre-adjusted number.

The prescribed time interval $t_s$ and the measured time interval $t_m$ are compared in an anti-coincidence circuit V, their sign being taken into account, that is to say that for the time $|t_m - t_s|$ the output $A_V$ has "L" potential if $t_m > t_s$ or the output $A_R$ has "L" potential if $t_m < t_s$.

As soon as the two counters $Z_{MW1}$ and $Z_S$ have again reached the zero position, a new measuring cycle can be started. This position is ascertained by the "and" gate $G_T$ which, when the counter $Z_{MW1}$ has reached the zero position, controls the time base circuit T in co-operation with the output of the inverter stage $N_{S1}$.

The device shown in FIG. 2 employs the device of FIG. 1 but is now used for a plurality of control circuits. The convertors for converting the measured values $MW_{11}$–$MW_{1n}$ in the separate control circuits are shown block-diagrammatically.

The device for producing the prescribed value consists of a counter $Z_S$ which is common to all control circuits and which counts the prescribed value and further of an individual pre-selection device $D_1 \ldots D_n$ for each control circuit, a bistable control stage $FF_{S1} \ldots FF_{Sn}$, an "and" gate $G_{S1} \ldots G_{Sn}$ and an inverter stage $N_{S21} \ldots N_{S2n}$ and a connecting circuit consisting of an "and" gate A and an inverter stage $N_{S1}$. The device operates in the same manner as the device of FIG. 1 described hereinbefore, however, with the difference that the counting process is not stopped and the counter is not changed back until the greatest of the pre-selected numbers $Z_{Si}$ has been attained. The prescribed time intervals produced at the outputs of the "and" gates $G_{Si}$ have a respective duration of $t_{Si} = z_{Si}/f_p$.

Since a new measuring cycle cannot be started until the counter for the prescribed value $Z_S$ and all the counters $Z_{MW11} \ldots Z_{MW1n}$ of the convertors for the measured value $MW_{11} \ldots MW_{1n}$ have reached the zero position, the number of inputs of the "and" gate $G_T$ is enlarged accordingly.

The device described is particularly suitable for measured frequencies which are very small in comparison with the pulse frequency of the clock generator. In this case, only a negligible part of the information obtained by the measurement gets lost, since the periods $t_m$ for negative counting during which the measuring process is interrupted are short in comparison with the measuring time $t_M$ ($t_m \ll t_M$).

If the condition $t_m \ll t_M$ is not fulfilled, use may be made of the device in accordance with the invention shown in FIG. 3 which operates without the measuring process being interrupted.

FIG. 3 shows a convertor $MW_2$ for the measured value which is distinguished from the convertor $MW_1$ described hereinbefore in that the gate stage $G_V$ (FIG. 1) is replaced by an anti-coincidence circuit A having a positive and a negative input for the difference counter $Z_{MW2}$. The independently operating time base T supplies pulses at predetermined time intervals $t_M$ synchronized by the clock generator.

The frequency to be measured is continuously supplied to the positive input $E_V$ and written in the counter. The bistable flip-flop circuit FF is changed over by the pulse $t_{Msyn}$ originating from the time base T so that the output C reaches "L" potential which is applied through the "and" gate $G_R$ to the negative input $E_R$. If $f_p > f_m$, the counter $Z_{MW2}$ is passed to the zero position at the difference frequency $f_p - f_m$. As soon as the counter reaches the zero position, this is ascertained by the "and" gate $G_O$ and the bistable flip-flop FF is changed back to the initial position and the negative counting input $E_R$ is blocked via the "and" gate $G_R$. Subsequently, the counter $Z_{MW2}$ counts positively with the frequency to be measured $f_m$ until the following time base pulse enters. In the stationary state and at a constant frequency to be measured, the counter has invariably reached the same position when the time base pulse enters. Consequently, the duration $t_m$ of the "L" potential at the output of the "and" gate $G_R$ is proportional to the frequency to be measured. Consequently, it holds:

$$t_m = f_m \cdot \frac{t_M}{f_p}$$

FIG. 4 shows a control device for several control circuits consisting of a convertor (shown block diagrammatically) of the type $MW_2$ of FIG. 3 and a device for producing the prescribed value as shown in FIG. 2. The time base circuit is not synchronized so that the "and" gate $G_T$ shown in FIGS. 1 and 2 is dispensed with.

The two devices described fulfill the requirement essential to the ratio controls that the ratio of the components can be written numerically. If, for example, it invariably hold that $$\sum_{.=1}^{n} z_{Si} = 1000$$

the adjusted values $z_{Si}$ correspond with the portions of the components in percent independently of the absolute values of the controlled quantities of the frequency $f_p$ of the clock generator and of the measuring time $t_M$. The absolute values of the controlled quantities may be varied through the $t_M$ and the dynamic behaviour of the control devices through $f_p$.

The two devices described have the advantage that, independently of the number of control circuits of the device for producing the prescribed value, each control circuit requires only one counter for the prescribed value. As far as the required apparatus is concerned, this is of particular importance for devices having a great plurality of control circuits, since the required capacity of the counter for the prescribed value only depends upon the desired accuracy and not upon the number of control circuits.

What is claimed is:

1. A ratio control device for producing a control signal in response to the ratio between a measured frequency and a fixed frequency, comprising, a first time base generator for converting a measured frequency into a proportional time interval and including a two directional counter, a source of clock pulses, means connected to said counter for storing in said counter a count corresponding to said measured frequency over a predetermined time period, means connecting said source of clock pulses to said counter for reducing said counter to a zero condition over a first time interval, said first time interval corresponding to said measured frequency, a comparator, means coupling said counter to said comparator for providing a signal representative of said first time interval to said comparator, a second time base generator, said second time base generator including a second counter preset to a desired count corresponding to said fixed frequency, means coupling said source of clock pulses to said second counter for reducing said desired count to zero, the time to zero of said second counter defining a second time interval, and means coupling said second counter to said comparator for providing a signal representative of said second time interval to said comparator, said comparator responsive to said first and second time intervals for providing said control signal.

2. The combination of claim 1 further including a plurality of first time base generators for converting a plurality of measured frequencies to corresponding time interval signals, a plurality of second time base generators for converting a plurality of fixed frequencies to corresponding time interval signals, and a plurality of said comparators, each comparator comparing corresponding pairs of measured frequency time interval signals and fixed frequency time interval signals.

3. The combination of claim 1 wherein said first time base generator comprises a first AND gate having an input coupled to said measured frequency, timing means for generating a time period signal, said first AND gate responsive to a coincidence between said time period signal and said measured frequency for producing a counting signal, said two directional counter having a count-up input coupled to the output of said AND gate and responsive to said counting signal for storing therein a count representative of said measured frequency, said timing means generating a second timing signal, a flip-flop connected to said timing means and responsive to said second timing signal for producing a gating signal, a second AND gate, said second AND gate responsive to said gating signal and a non-zero counter state for coupling said source of clock pulses to a count down input of said two directional counter, means responsive to the presence of a zero count in said two directional counter for reversing the state of said flip-flop and thereby blocking said gating signal from said two directional counter, and means connecting the output of said second AND gate to said comparator.

4. The combination of claim 1 wherein said first time base generator comprises an anticoincidence circuit having positive and negative outputs respectively connected to each directional input of said two directional counter, means applying said measured signal to said positive input of said anticoincidence circuit for entering said measured value in said counter, a flip-flop responsive to a signal marking the beginning of said first time interval for providing a gating output, an AND gate responsive to said gating output and a non-zero condition of said counter for coupling a backward count signal to said negative input of said anticoincidence circuit said counter thereby counting down to zero, said AND gate responsive to said zero condition for cutting off said gating output, the duration of said gating output corresponding to said first time interval.

References Cited

UNITED STATES PATENTS

| | | | |
|---|---|---|---|
| 2,986,699 | 5/1961 | McHenry ------ | 328—134 XR |
| 3,112,478 | 11/1963 | Ostroff ---------- | 324—78 XR |
| 3,164,777 | 1/1965 | Guanella ----------- | 328—134 |
| 3,200,340 | 8/1965 | Dunne -------- | 328—134 XR |
| 3,267,372 | 8/1966 | Fritzsche et al. ---- | 324—79 XR |

DONALD D. FORRER, Primary Examiner

J. ZAZWORSKY, Assistant Examiner

U.S. Cl. X.R.

307—233; 324—79